United States Patent [19]

Storar

[11] Patent Number: 5,218,860

[45] Date of Patent: Jun. 15, 1993

[54] AUTOMATIC MOTOR TESTING METHOD AND APPARATUS

[75] Inventor: Robert C. Storar, Dayton, Ohio

[73] Assignee: Automation Technology, Inc., Dayton, Ohio

[21] Appl. No.: 765,591

[22] Filed: Sep. 25, 1991

[51] Int. Cl.⁵ .......................................... G01M 15/00
[52] U.S. Cl. .................................. 73/116; 73/517 A; 318/490
[58] Field of Search ............................ 73/116, 517 A; 324/158 MG; 318/490

[56] References Cited

U.S. PATENT DOCUMENTS

| | | | |
|---|---|---|---|
| 2,724,801 | 11/1955 | Oster | 73/116 X |
| 3,505,863 | 4/1970 | Lucia | 73/116 |
| 4,204,425 | 5/1980 | Mallick, Jr. | 73/116 |
| 4,922,172 | 5/1990 | Roddy et al. | 324/378 X |

FOREIGN PATENT DOCUMENTS 2529674  1/1984  France ................................. 73/116

Primary Examiner—Jerry W. Myracle
Attorney, Agent, or Firm—Biebel & French

[57] ABSTRACT

A method and apparatus for testing the starting torque of electric motors includes attaching a flywheel of known diameter and weight to the motor's shaft along with an incremental encoder and measuring the amount of shaft rotation during known time intervals. A counter receives the output pulses from the encoder and a data latch captures the value of the counter at regular time intervals, such as once or twice during a cycle of an alternating current power line or upon zero crossing of the current to the motor. The count for each interval is retained in computer memory and later compared with a previous count to indicate changes in RPM from one interval to another. The change in RPM is a function of torque and can be plotted against motor speed, which is also calculated from the encoder output.

4 Claims, 21 Drawing Sheets

FIG-11

FROM (FIG 9)
↓
GET EDL(i)
GET EDH(i)
↓
ENABLE TIME OUTPUT
↓
GET TDL(i)
GET TDH(i)
↓
PULSE "DATA RECIEVED" LINE
↓
i = i + 1
↓
i>500 ?
— N → TO "STARTTEST" (FIG 9)
— Y ↓
TURN MOTOR OFF
↓
TO FIG 12

FIG·14

AUTOMATIC MOTOR TESTING METHOD AND APPARATUS

BACKGROUND OF THE INVENTION

This invention relates to a method and apparatus for the automatic testing of electric motors, and particularly the testing of motor torque from motor startup until it reaches full speed.

In the testing of motors, and particularly the testing of induction motors, it is traditional to load the motor and use a torque transducer to provide a measure of torque.

Examples of prior art motor testers are shown in U.S. Pat. Nos. 3,402,600, 3,898,875, 4,084,428, 4,327,578, and 4,807,467.

A more direct way of measuring torque than using a conventional torque transducer would provide more accurate and time responsive measurements, revealing more information about the actual operations of the motor during its starting phase of operations.

SUMMARY OF THE INVENTION

The preferred embodiment of this invention, the shaft of an electric motor is attached to a known inertial load. Usually, this load will be a flywheel of known mass and diameter supported on a shaft by low friction bearings and connected to the motor shaft by a coupling device. For some larger motors, the mass of the armature may be sufficient to provide a proper inertial load.

An incremental encoder is connected to the shaft for indicating the amount of angular rotation of the motor. By starting the motor at a known time, and measuring the amount of rotation during known time intervals, the motor's torque can be calculated for each of those time intervals.

In a preferred embodiment, power is supplied to the motor under test at a precise point in the power line cycle. As the motor begins to accelerate, the rate of the pulses from the incremental encoder will increase. These pulses are applied to a binary counter circuit which accumulates them. At regular time intervals, the number of pulses in the binary counter circuit will be read and stored in a computer memory.

The known formula for determining acceleration time for a rotating body is:

$$\text{Time (sec)} = \frac{WR^2 \times \Delta RPM}{308 \times \text{Torque (ft - lbs)}} \text{ where}$$

$$WR^2 \text{ (internal load)} = \frac{\text{Weight (lbs)} \times [\text{radius (ft)}]^2}{2}$$

Torque can therefore be calculated directly by using the following formula $$\text{Torque (ft - lbs)} = \frac{WR^2 \times \Delta RPM}{308 \times \text{Time (sec)}}$$

Since the torque of the motor is a function of its change in RPM within a known period of time, the torque of the motor at each measurement interval can be calculated. The encoder also provide a direct measurement of the motor's speed.

It is therefore an object of this invention to provide a method of testing the torque characteristics of an electric motor including the steps of attaching the shaft of an electric motor to a known inertial load, supplying power to the motor at a specified time, measuring the amount of rotation of the motor shaft within known time intervals, calculating the motor's torque by reference to the inertial load and the amount of motor shaft rotation within each of the time intervals, and displaying the motor's torque with reference to the speed of the motor shaft.

It is a further object of this invention to provide an electric motor testing apparatus for determining the torque available at the motor's output shaft, said apparatus comprising means for connecting a known inertial load to said motor's output shaft, means for supplying power to a motor under test to cause rotation of the motor's output shaft, means connected to the output shaft for sensing the amount of angular rotation thereof within known increments of time, means for computing the torque generated by said motor at each known time interval in response to changes in the angular rotation of the motor's output shaft.

Other objects and advantages of the invention will be apparent from the following description, the accompanying drawings and the appended claims.

BRIEF DESCRIPTION OF THE DRAWINGS

FIGS. 7–21 are computer flowcharts illustrating a preferred method of testing motors.

DESCRIPTION OF THE PREFERRED EMBODIMENT

Figure 1:
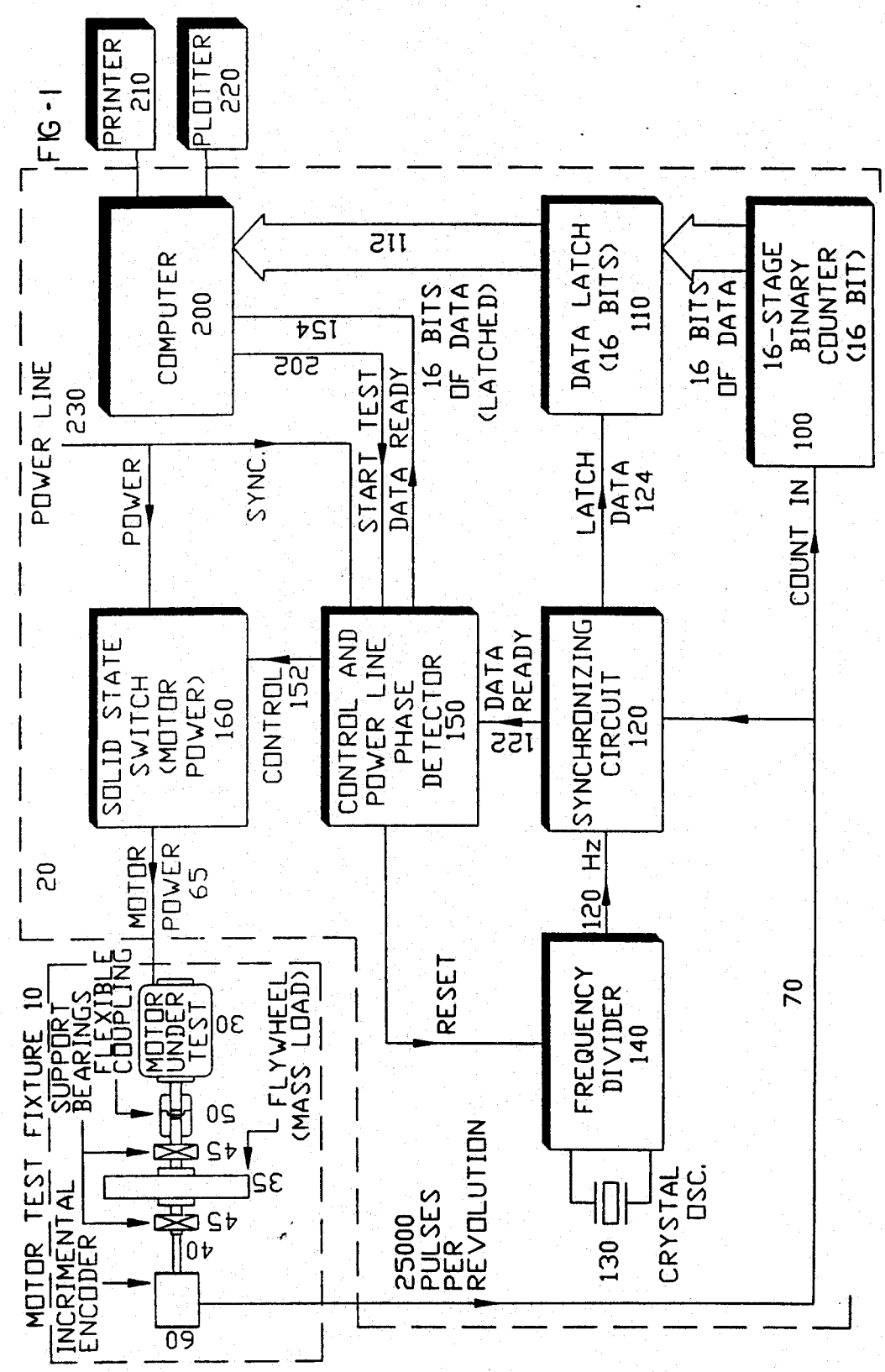
FIG. 1 is a block diagram showing the various mechanical and electrical components of a first embodiment of this invention.

Referring now to the drawings which illustrate a preferred embodiment of the invention, and particularly to the block diagram of FIG. 1 which represents a first embodiment of the invention, a motor test fixture is represented at 10, and the electronic analysis equipment is represented at 20.

The motor test fixture 10 include a motor 30 undergoing test, a flywheel 35 of known mass and diameter supported on a shaft 40 by low friction bearings 45. The motor 30 is connected to the shaft 40 by means of a releasable and flexible coupling device 50. In a production line test operation, a motor 30 would be brought into the test fixture 10 by conveyor or other appropriate means and automatically connected to the shaft through a flexible coupling, which accommodates for any slight misalignment between the motor's shaft and the shaft 40. The test would be conducted, and then a new motor would be brought into position for testing.

An incremental encoder 60 is attached to the shaft 40 for providing output pulses proportional to the amount of rotation of the motor shaft. This encoder is capable of producing 25,000 pulses for each rotation of the shaft. In the preferred embodiment, the encoder is a type E25BB-4H-12, 500-M5-AB-8830-LED-SC18 encoder made by BEI Motion Systems. This encoder has A and B tracks to permit monitoring of the direction of rotation of the motor.

The electronic analysis equipment 20 may be located remote from the test fixture 10 and is connected thereto by means of cables 65 and 70. Cable 65 supplies power to drive the motor 30 and cable 70 carries the output pulses from the encoder 60 to the electronic analysis equipment 20.

The electronic analysis equipment 20 includes a counter 100, a data latch 110, a synchronizing circuit 120, a crystal oscillator 130, a frequency divider 140, a control and power line phase detector 150, and a solid state switch 160. A computer 200, such as a conventional personal computer, is also included as a part of the electronic analysis equipment 20, and its output is typically displayed by means of a printer 210 and a plotter 220 in addition to the usual video display terminal. The computer 200 includes memory circuits, as will be explained.

Figure 3:
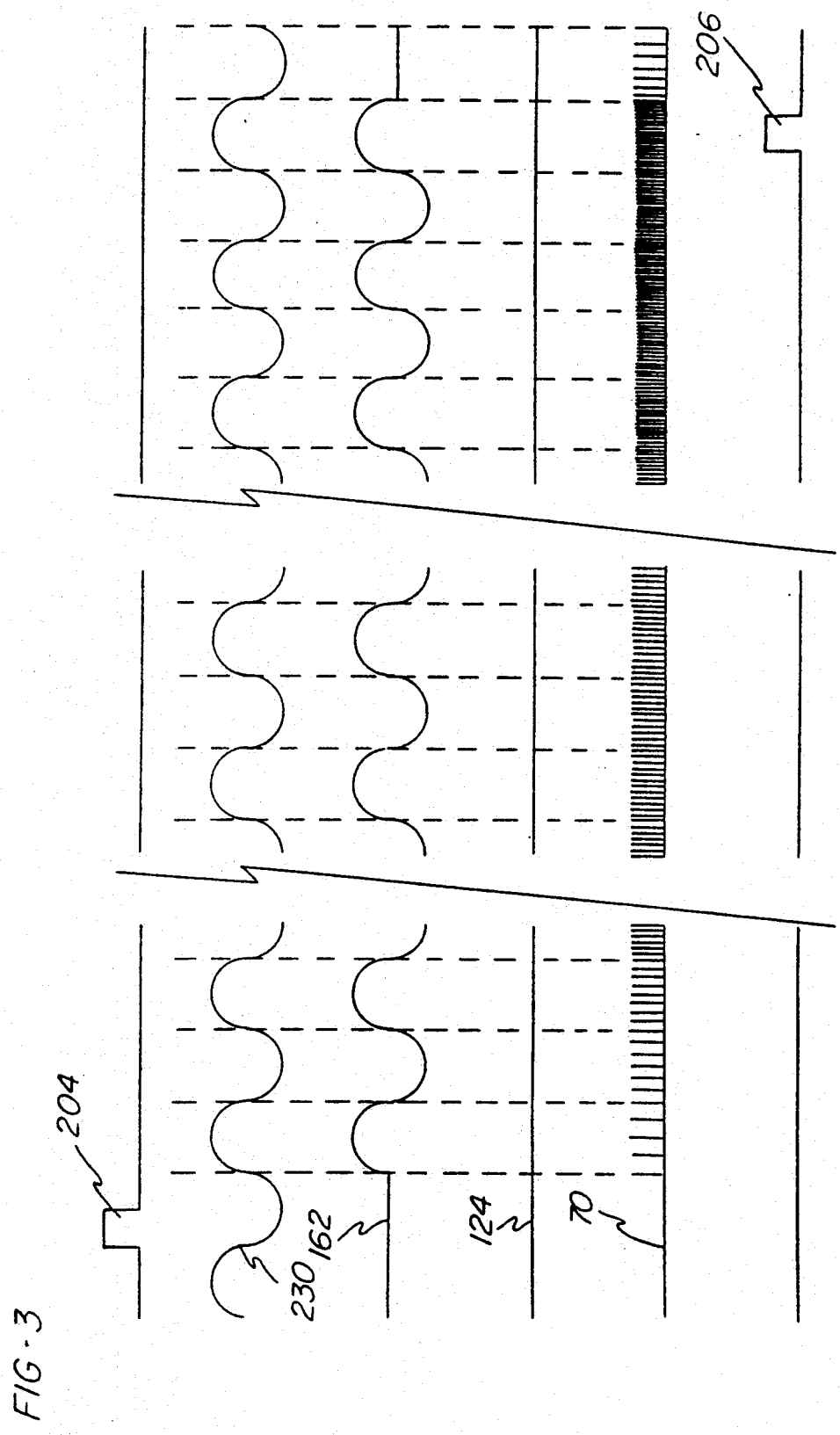
FIG. 3 is a timing diagram showing the waveforms at selected positions in the block diagram of FIG. 1.

In operation, a start test signal on line 202 is generated by the computer 200. This start signal may be manually initiated by an operator through the computer's keyboard (not shown) or automatically in response to the motor being properly positioned in the test fixture 10. As shown in FIG. 3, this signal is a single pulse 204 which is detected by the control circuit 150. The control circuit 150 delays initiation of the test sequence until a precise point in the power line cycle, then starts the time base oscillator 130 and energizes the solid state switch 160.

As shown in FIG. 3, a power line signal on line 230 is applied to both the solid state switch 160 and the control circuit 150. The control circuit 150 senses the next zero crossing of the power line current waveform and then generates a control signal on line 152 to the solid state switch which in turn applies power to the motor 30 on line 162.

The control circuit 150 also receives a data ready signal on line 122 from the synchronizing circuit 120 and relays those signals to the computer via line 154.

When the motor 30 receives power, its output shaft begins to rotate, and this rotation is detected by the incremental encoder 60 which applies its output pulses on line 70 to counter 100. This counter is a 16-bit binary counter which accumulates the pulses generated by the incremental encoder 60.

The electronic analysis equipment 20 includes timer means responsive to the control circuit 150 for providing output signals at fixed time intervals in timed relation to the start of the motor test sequence. The timer means includes the crystal oscillator 130 and frequency divider 140. In one embodiment, the oscillator 130 operates at 2.4576 Mhz and this output is first divided by 1024 and then further divided by 20, giving an output pulse at 120 Hz, or once each half cycle of the power line input. This timing pulse, on line 142, is applied to the synchronizing circuit 120 and sent as a latch data signal on line 124 to the data latch 110 beginning at the first zero crossing, as shown in FIG. 3.

While timing pulses at the 120 Hz rate in synchronism with the input line voltage are described here, the rate could be set at any interval and could be synchronized with either the voltage or the current waveform to the motor under test.

Each time the data latch 110 receives a latch data pulse, it will capture the contents or the value of the count of the counter 100 and will hold that value until the next latch data pulse is received. In the meantime, the counter 100 continues to receive and record the incoming pulses from the incremental encoder 60. As can be seen in FIG. 3, the rate at which the encoder pulses are generated will increase as the motor accelerates from rest to its maximum speed, and the rate will then decrease when power to the motor is removed.

The contents of the data latch 110 are transferred to the computer 200 via line 112 where this data is stored in memory. This transfer occurs in the time interval between latch data pulses. The value of the count captured by the data latch 110 at each of said fixed intervals of time from the start of the motor at least until it reaches full speed is retained in the computer memory for later analysis. Thus, the computer itself comprises the storage means for the data during each of the timing intervals.

The computer 200 also comprises a means for computing the torque generated by the motor under test at each time interval in response to the amount of change in the angular rotation of the motor's output shaft from one time interval to the next. This is done by using a computer program, as described in the computer flow charts described hereinafter.

The motor's speed is also calculated from the output of the encoder by noting the number of encoder pulses accumulated in known time intervals.

Once full motor speed has been reached, the computer will generate a stop test pulse 206 to remove power from the motor 30. The stored data can then be analyzed and formatted and displayed both as a printed test report on the printer 210 and as a plotted graph of the test data on plotter 220.

Figure 4:
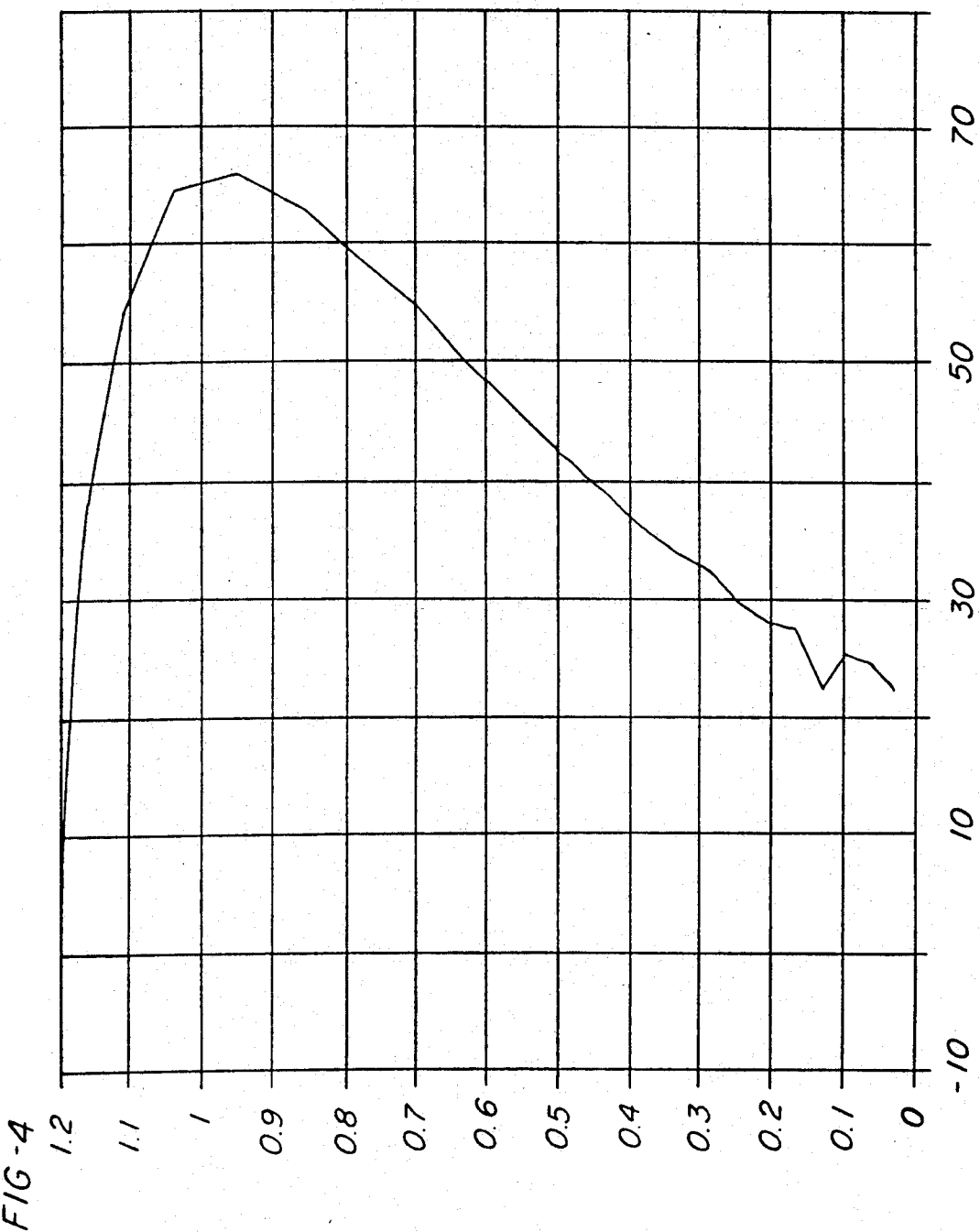
FIGS. 4–6 are waveform diagrams showing the relation between torque and speed.
Figure 5:
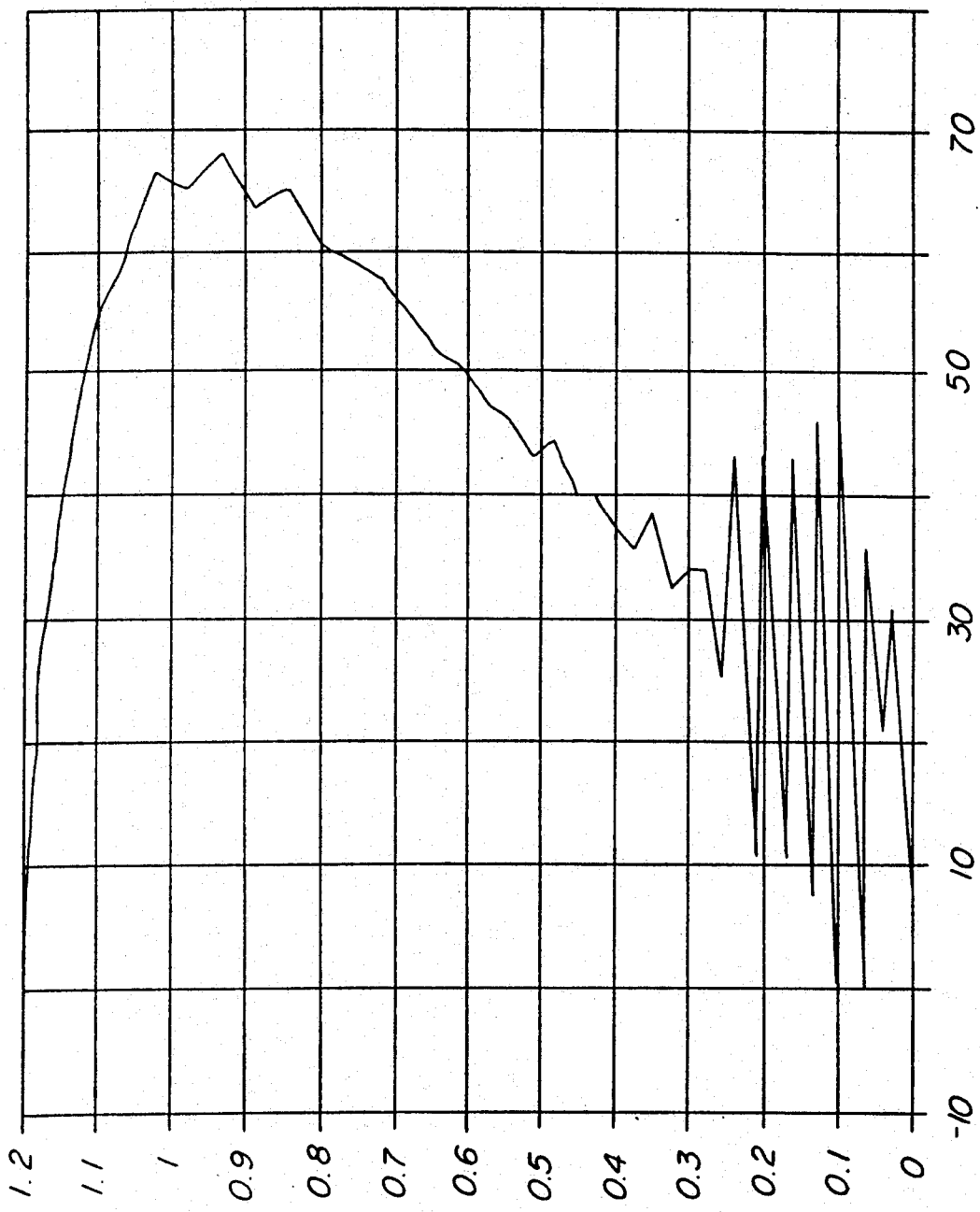
Figure 6:
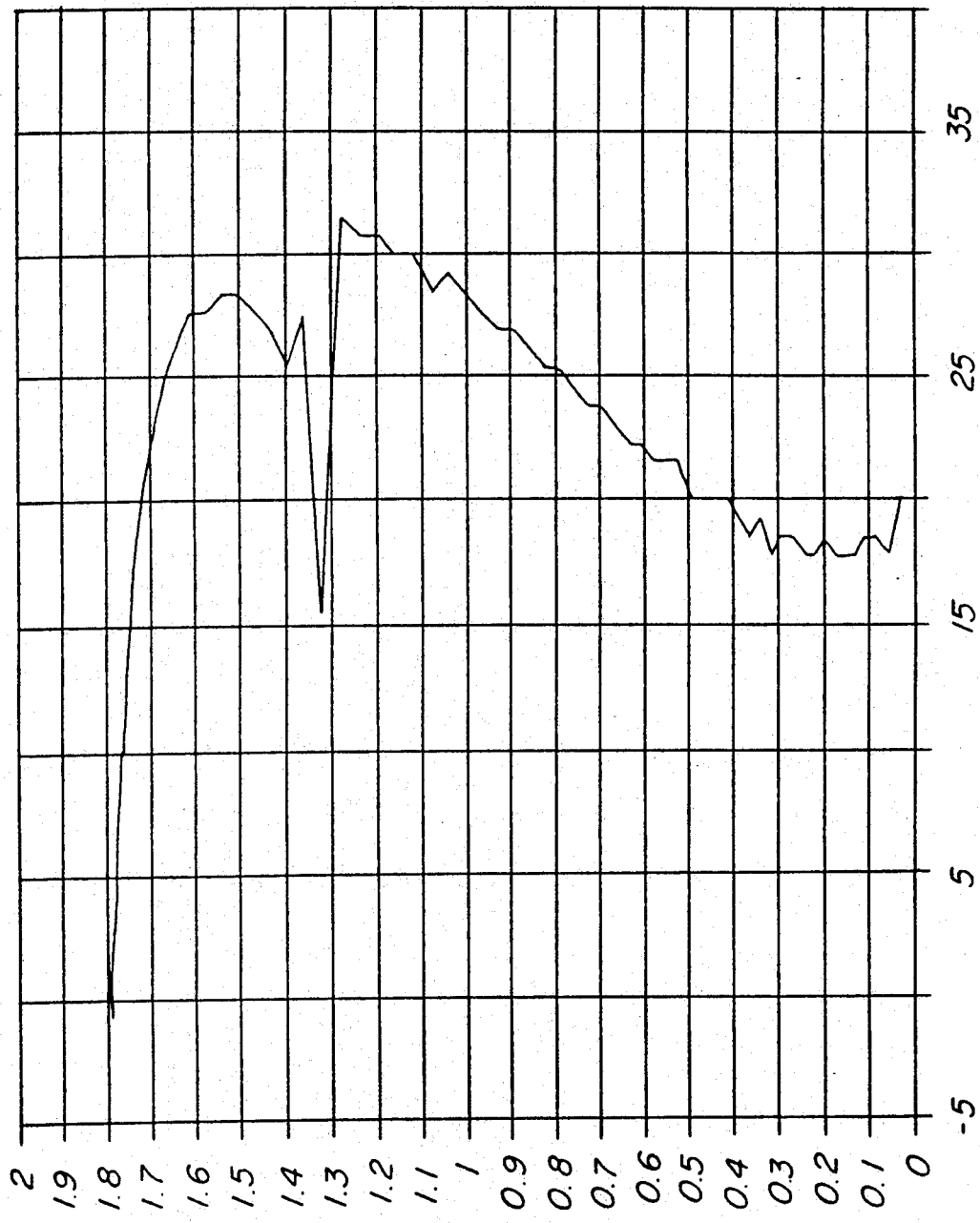

Referring now to the waveform diagrams of FIG. 4-6, the test results from two different induction motors 30 are plotted. In these drawings, the torque, in in-lbs, is plotted on the horizontal axis while the motor speed is plotted vertically.

FIG. 4 shows the results of test motor 1 with individual data points being plotted at a 60 Hz rate, or with the latch data pulses 124 being generated at a 60 Hz rate.

FIG. 5 shows the same motor, but with the latch data pulses being generated at a 120 Hz rate, thus showing a widely varying torque being generated as the motor starts.

FIG. 6 shows a different motor, also plotted at a 120 Hz latch data rate. This drawings shows clearly a marked change in torque due to the operation of a centrifugal switch at about 1300 rpm.

Figure 2:
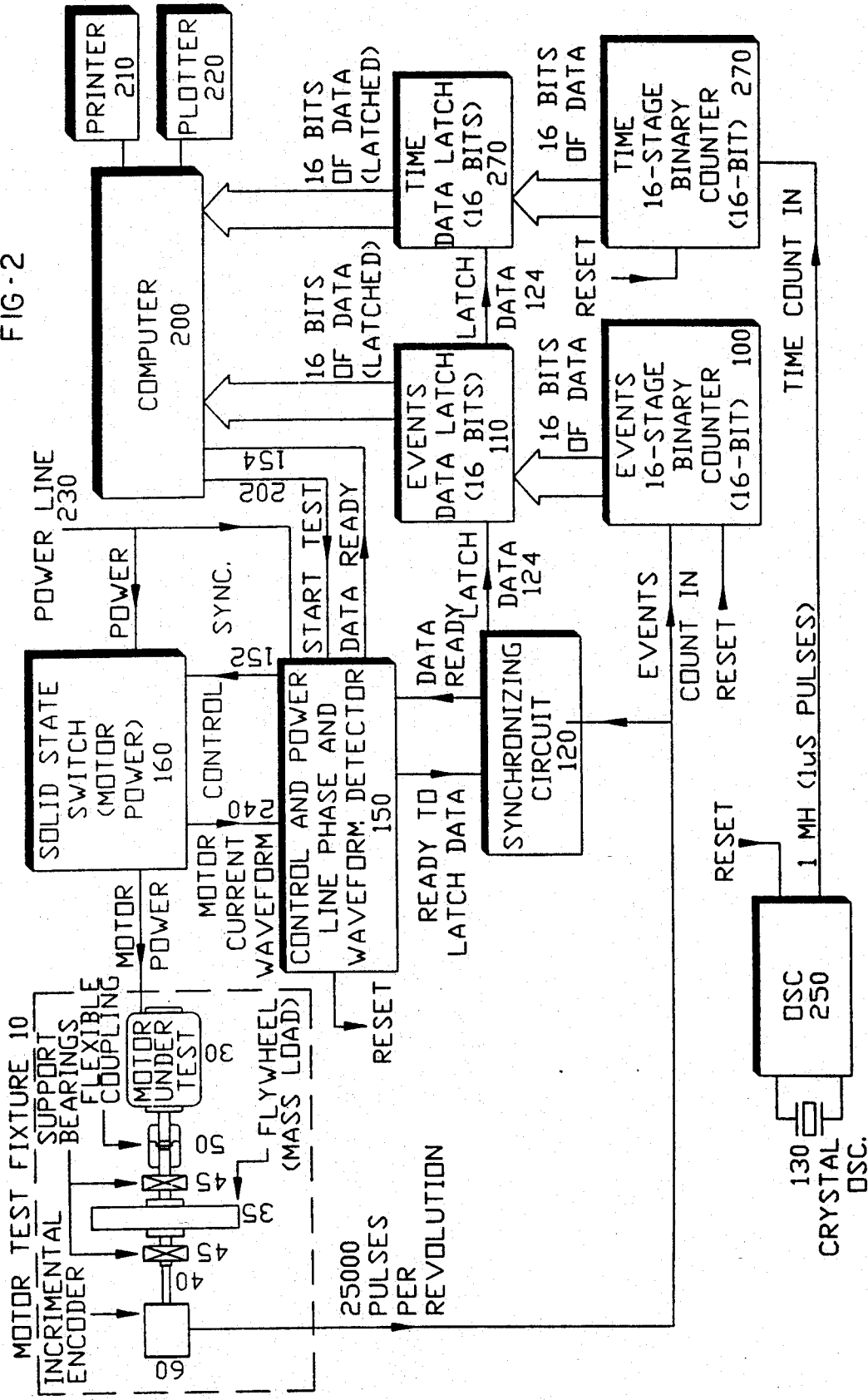
FIG. 2 is a block diagram showing the various mechanical and electrical components of a second embodiment of this invention.

In the first embodiment described above in connection with FIG. 1, measurements of the amount of rotation, or changes in RPM, are made at regular, fixed intervals, thus permitting the system to be controlled by the output of a crystal oscillator. In a second embodiment of the invention, measurements of rotation, or changes in RPM, are monitored at each zero crossing of the current applied to the motor. This requires the amount of time between data points also be recorded. FIG. 2 is a block diagram of a variable time measurement system. In this drawing, those element that perform the same function carry the same reference numerals.

The testing sequence is started by a command sent from the computer 200, which may be initiated by pressing a key on the computer keyboard to generate a Start Test signal on line 202 to a Control and Power Line Phase and Waveform Detector 150'. This circuit differs from the Control and Power Line Phase Detector 150 of FIG. 1 in that the zero crossing of the current supplied to the motor, as represented by a signal on line 240, is monitored and used to control the synchronizing circuit 120.

As in FIG. 2, the value of the output from the encoder 60 is recorded, but in this embodiment, the time is also recorded using the time pulses from an oscillator circuit 250, typically at a 1 MHz rate, to a counter circuit 260. At each latch data signal on line 124, both the events data latch circuit 110 and the time data latch circuit 270 operate to capture the value in the counters 100 and 260, respectively, which values are then stored in memory circuits within the computer 200.

If the inertia of the motor and flywheel is not known, an alternative method of determining inertia may be used. This method includes the steps of installing the motor in the test fixture and connecting the motor shaft to the flexible coupling, but not supplying power to the motor at any time during this phase.

A string or similar flexible member is wrapped around the periphery of the flywheel with a weight of known mass at the end thereof. When the weight is released, a known torque is applied to the entire rotating portion of the system. This known torque is merely the diameter of the flywheel times the known weight.

At the same time the weight is released, the system shown in FIG. 1 is activated, and the amount of rotation of the shaft within known increments of time is used to determine the change in rotational speed ($\Delta RPM$) using the following formula: $WK^2 = (308 \ t \cdot T)/\Delta RPM$ where $WK^2$ is the total inertia of the load accelerated in lb-ft$^2$, t is time in seconds to accelerate load (time between data points), T is torque in lb-ft, and $\Delta RPM$ is change in speed. Thus, if the inertia of the system is not known, it can be determined using the above steps.

Figure 7:
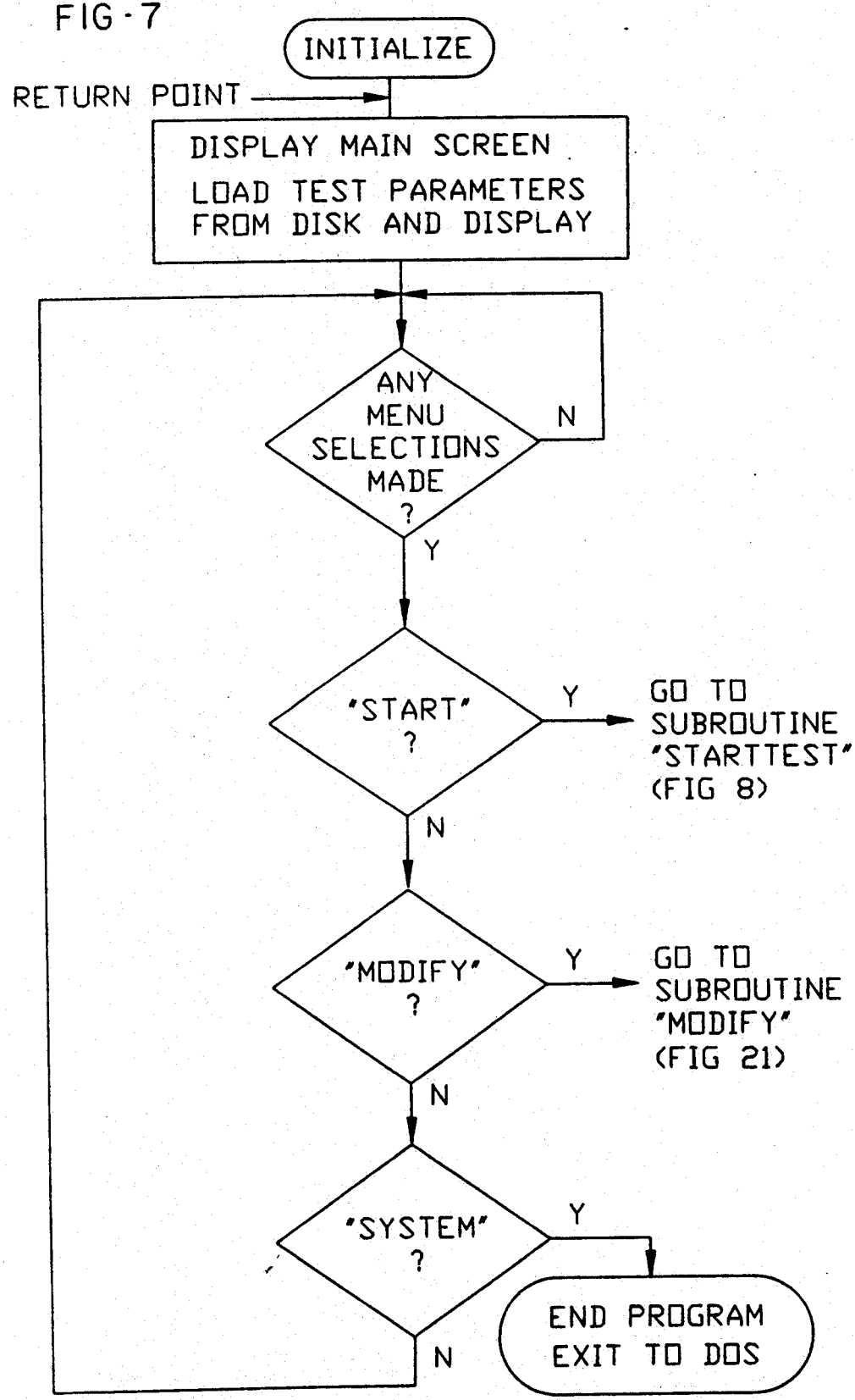
Figure 8:
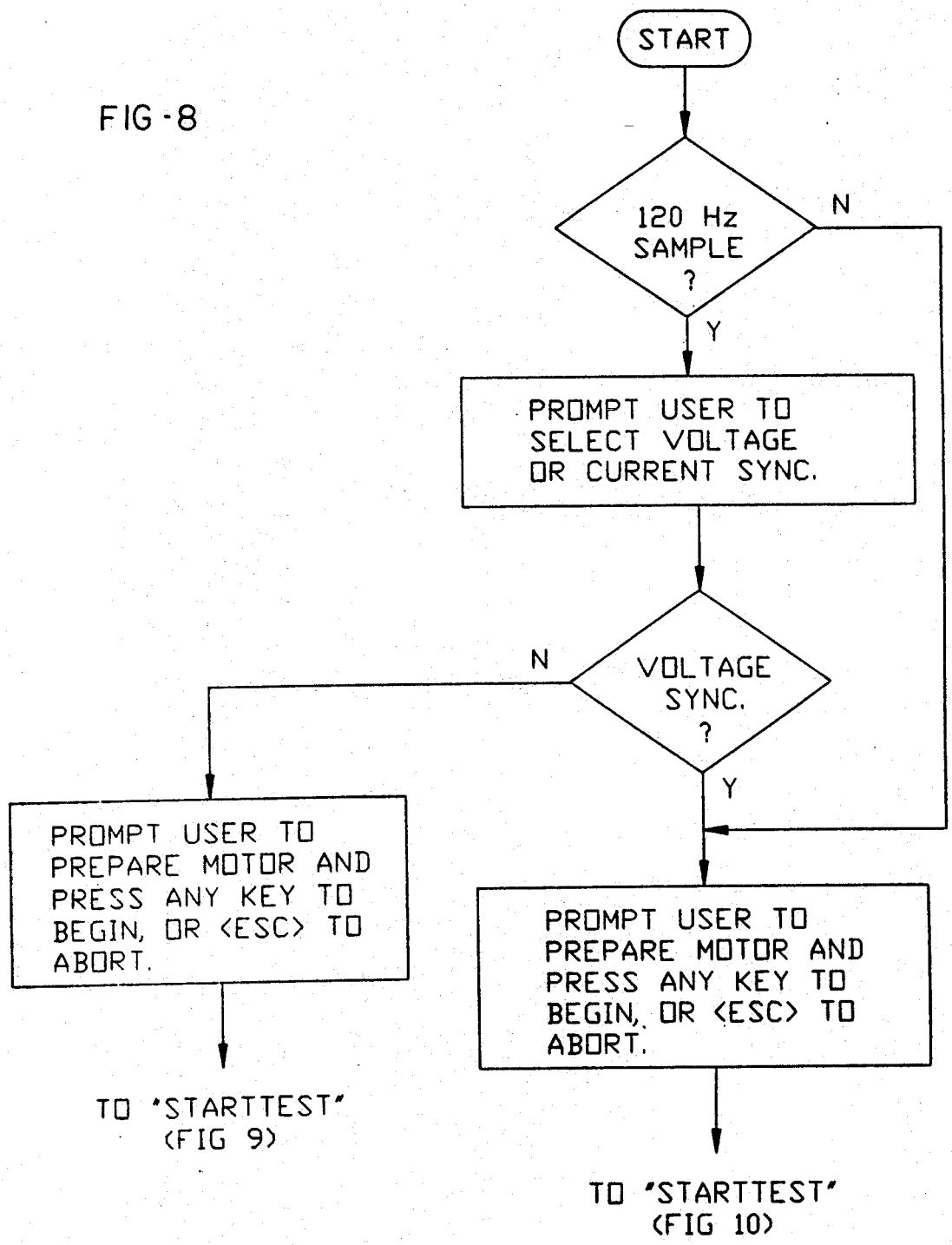
Figure 13:
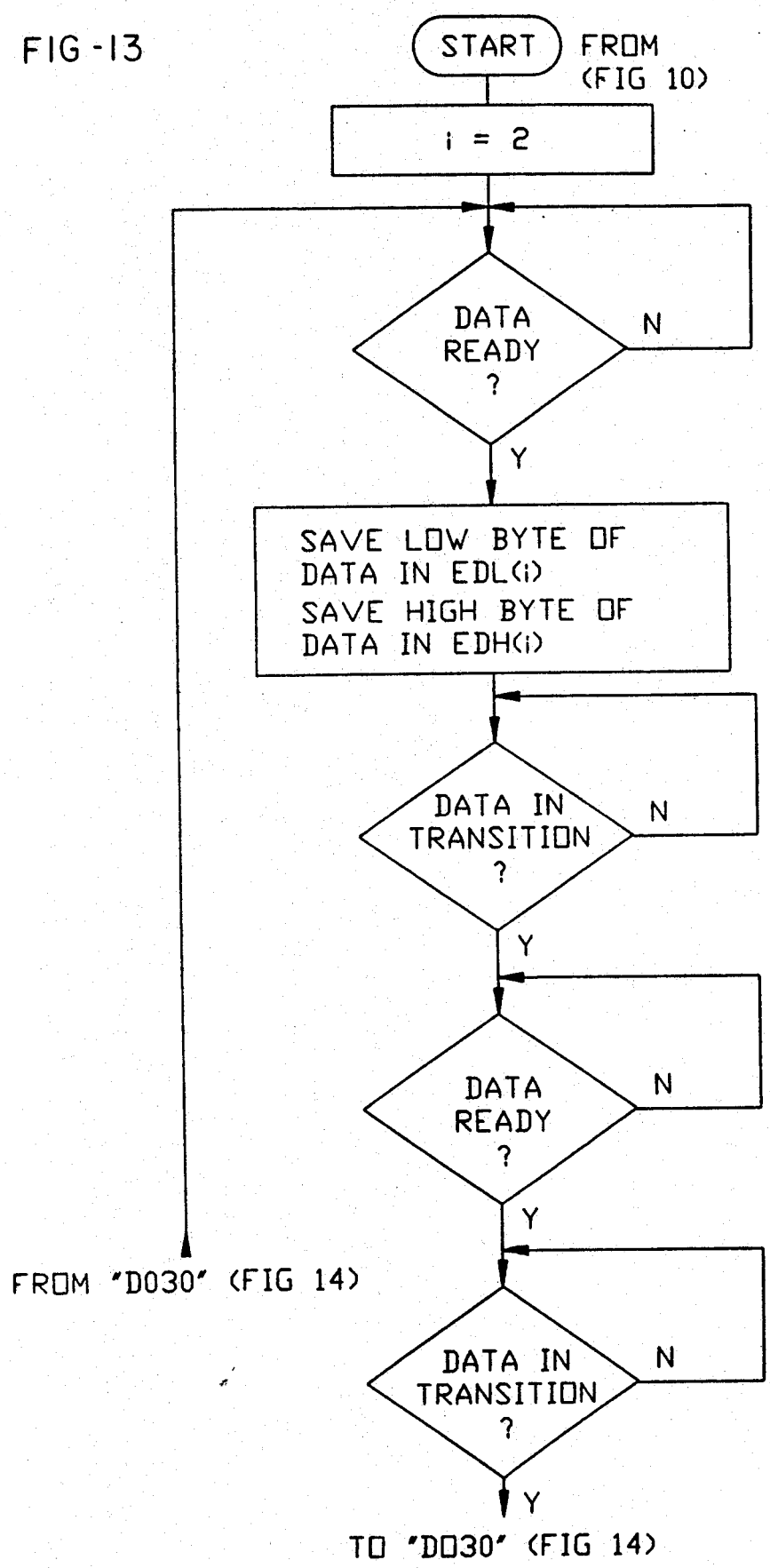
Figure 14:
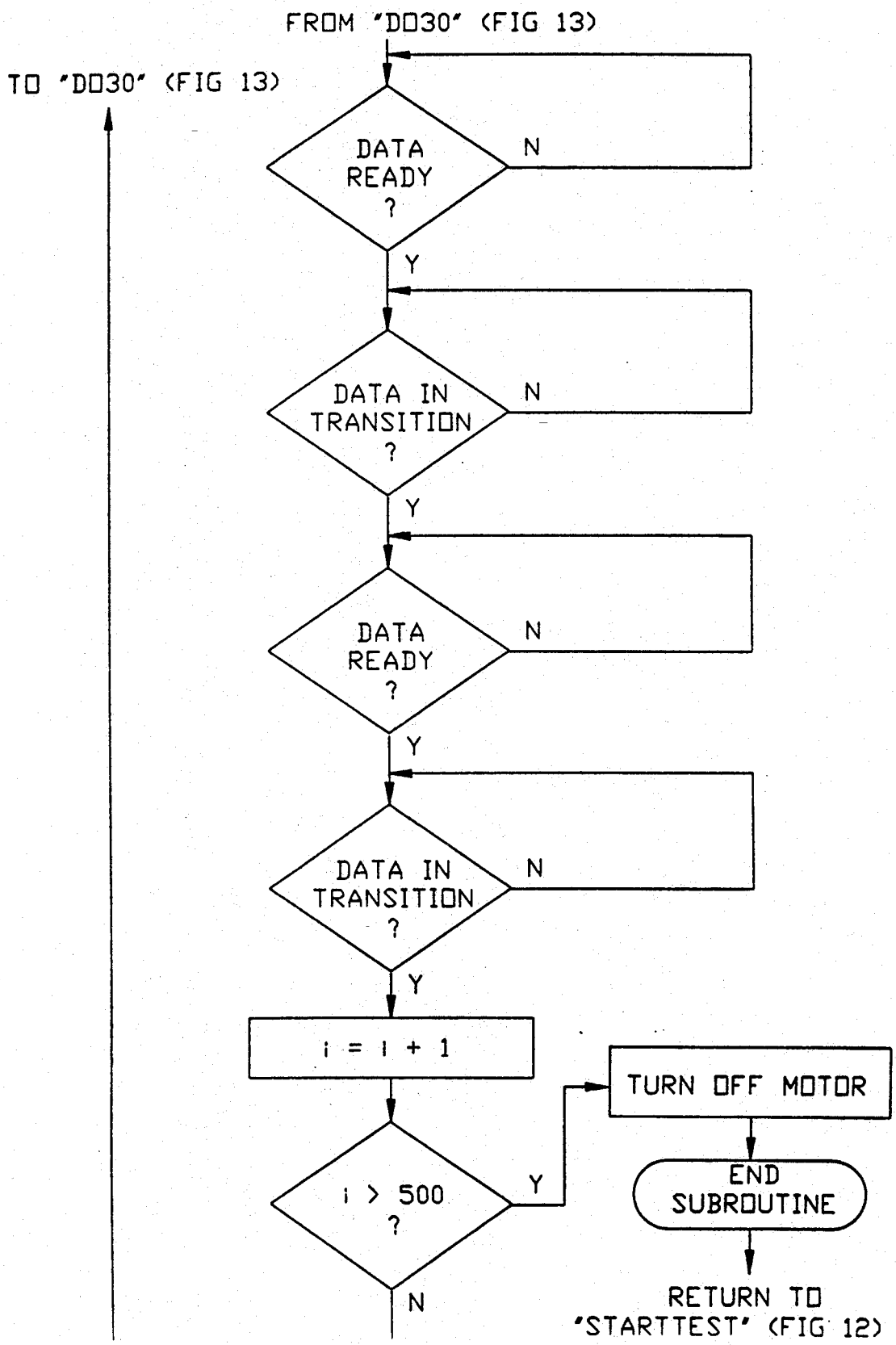
Figure 15:
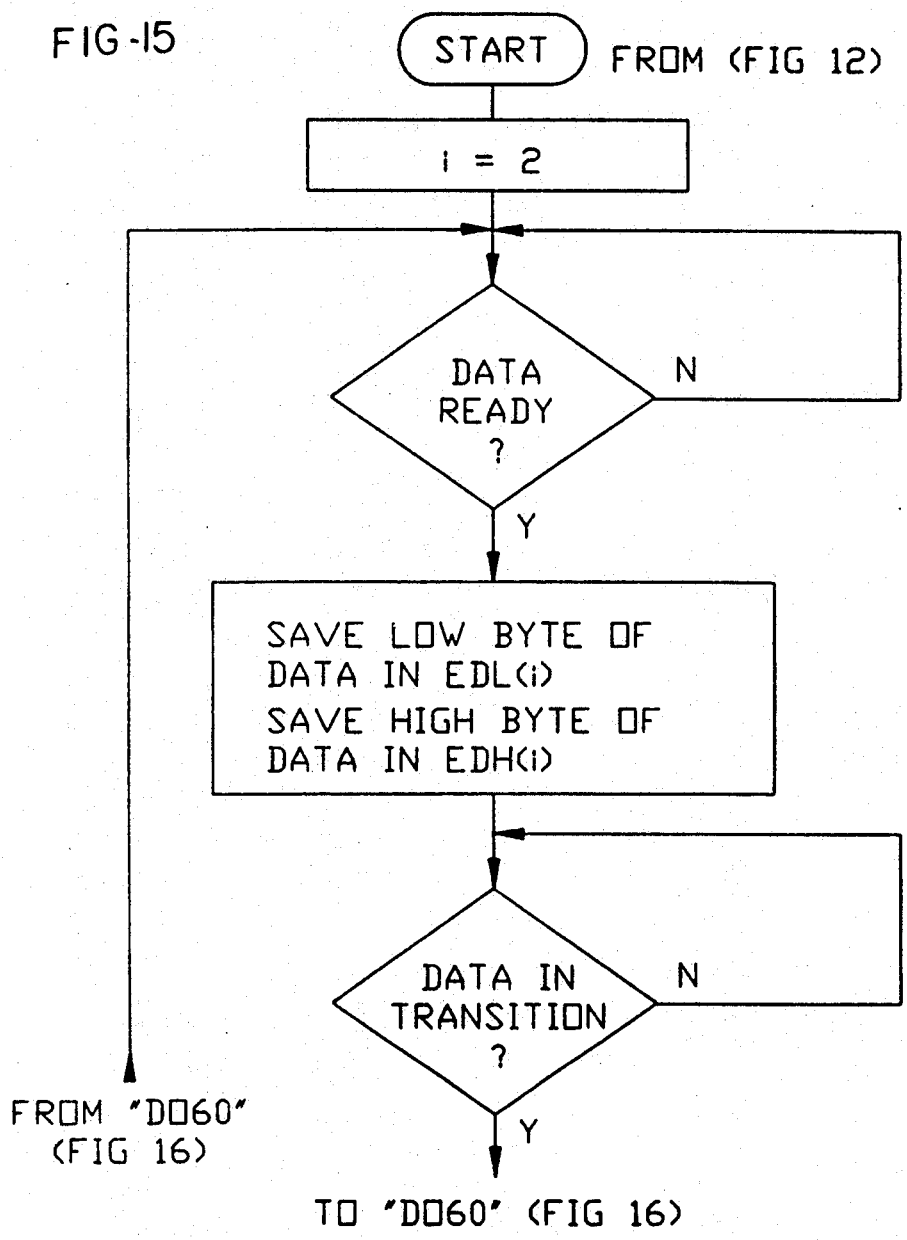
Figure 16:
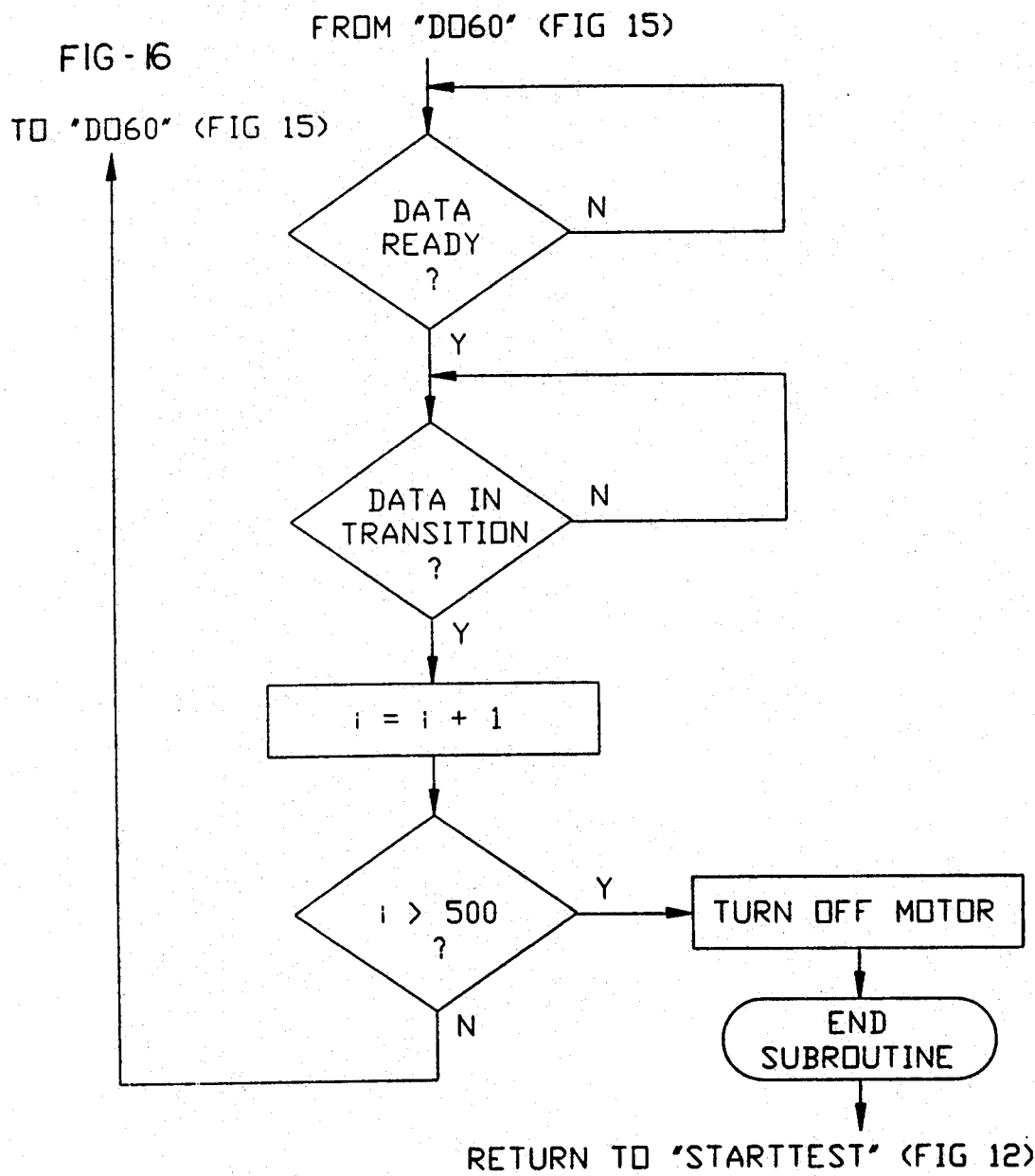
Figure 17:
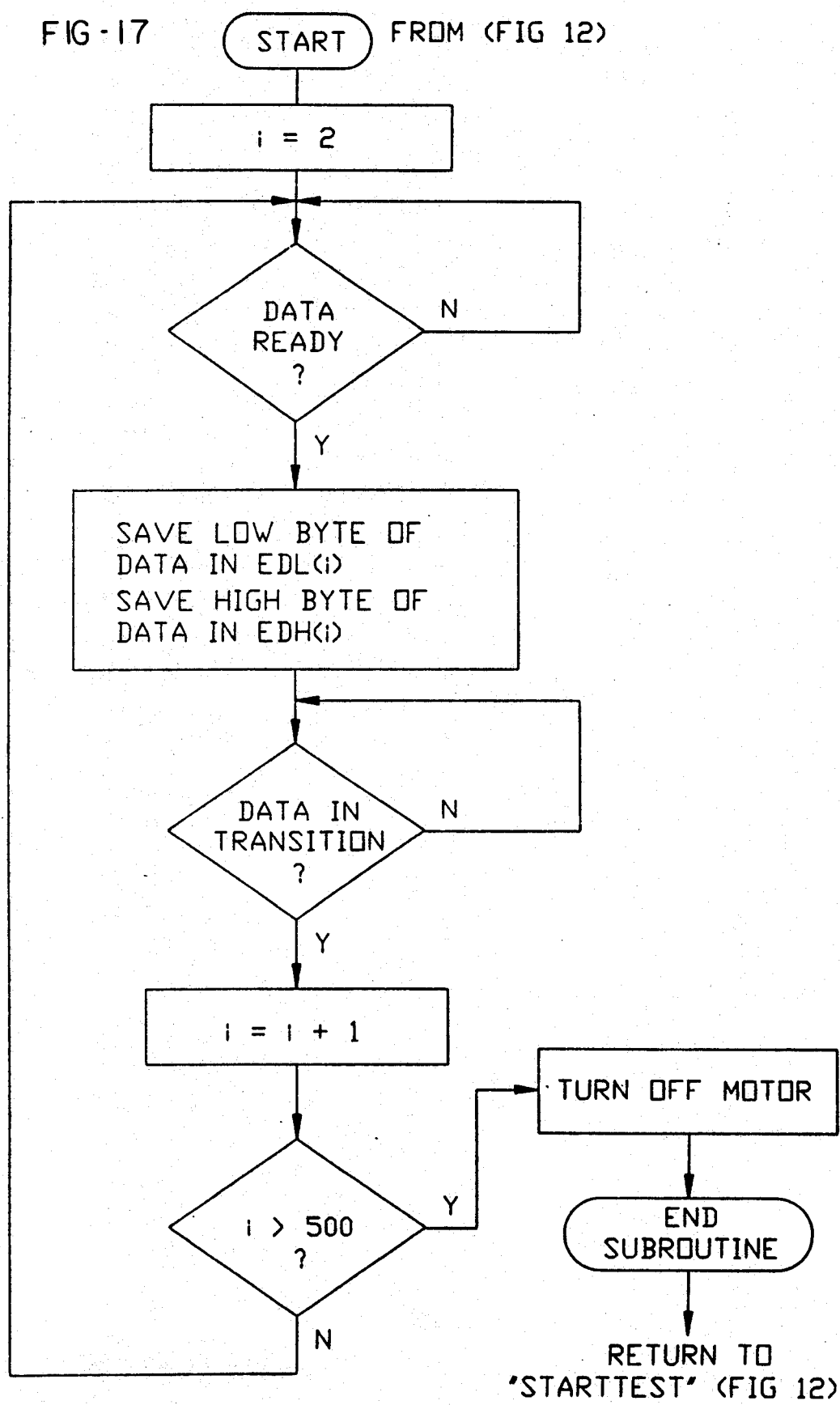

The computer 200 operates under the control of a computer program which is represented in the flow charts of FIGS. 7–21. FIG. 7 represents the main program. FIG. 8 represents a subroutine STARTTEST with FIGS. 10 and 12 comprising a part of the first embodiment and FIGS. 9 and 11 comprising a part of the second embodiment. FIGS. 13 and 14 comprise a subroutine of the first embodiment labeled DO30; FIGS. 15 and 16 comprise a subroutine labeled DO60; and FIG. 17 comprises a subroutine labeled DO120.

Figure 18:
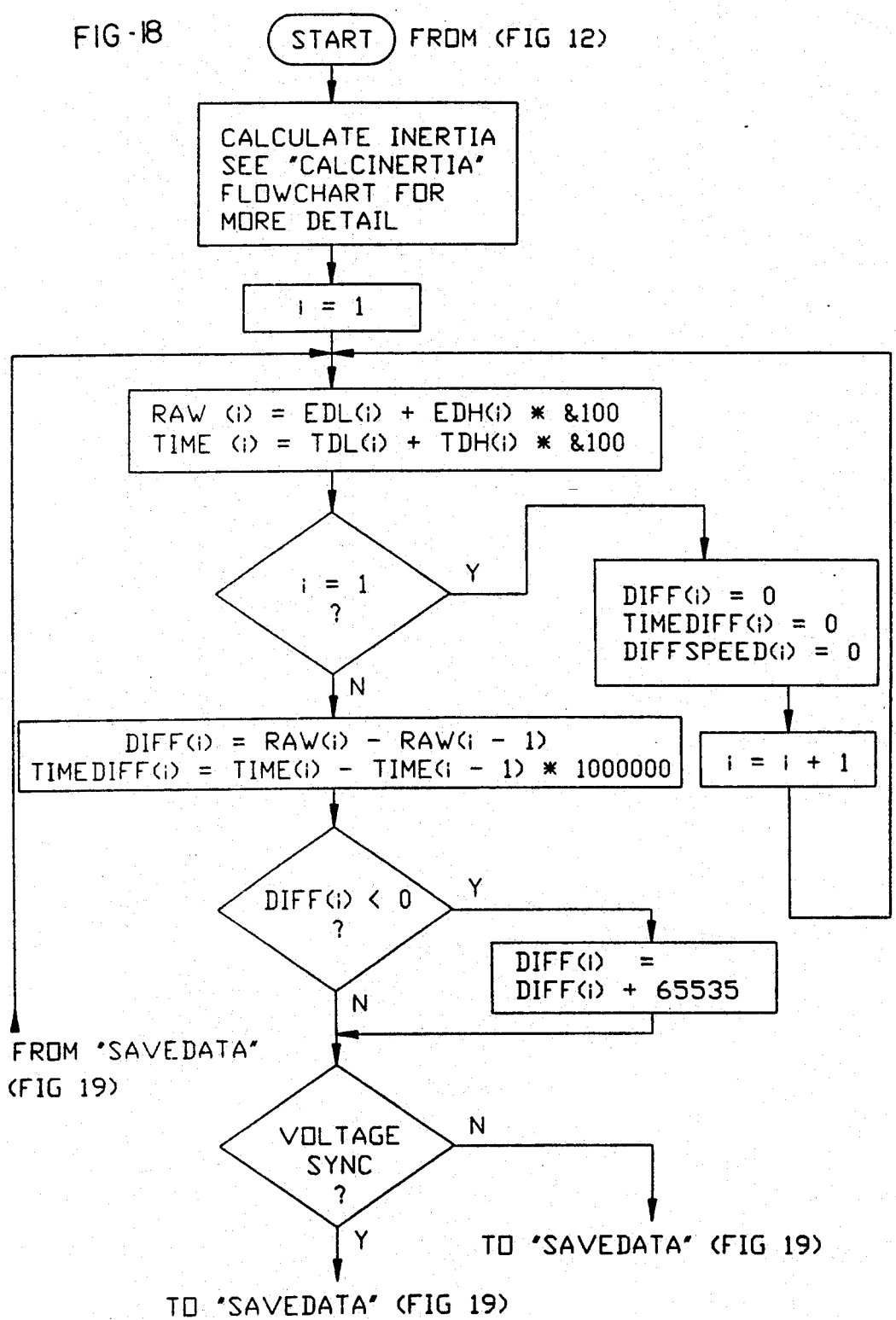
Figure 19:
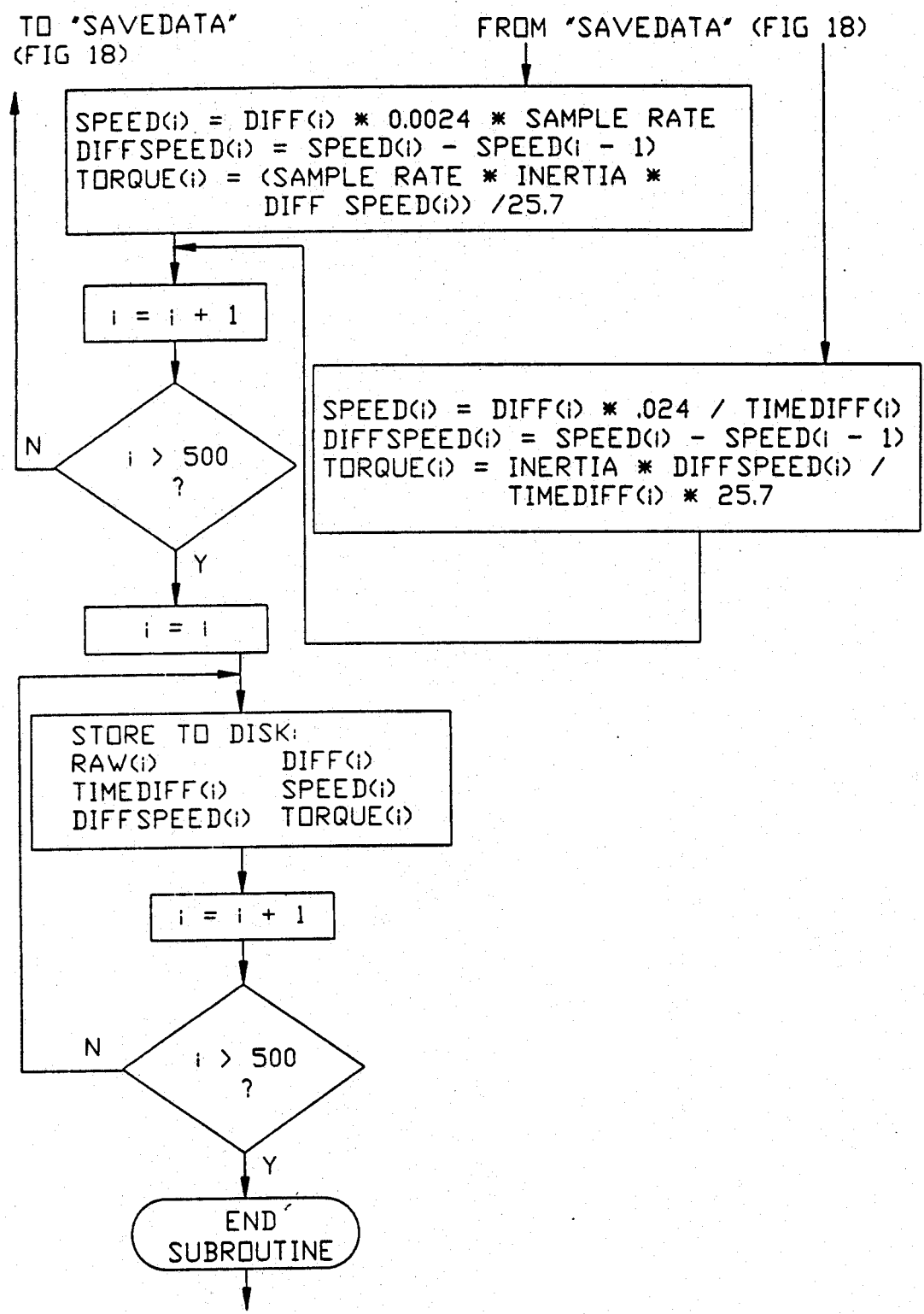
Figure 20:
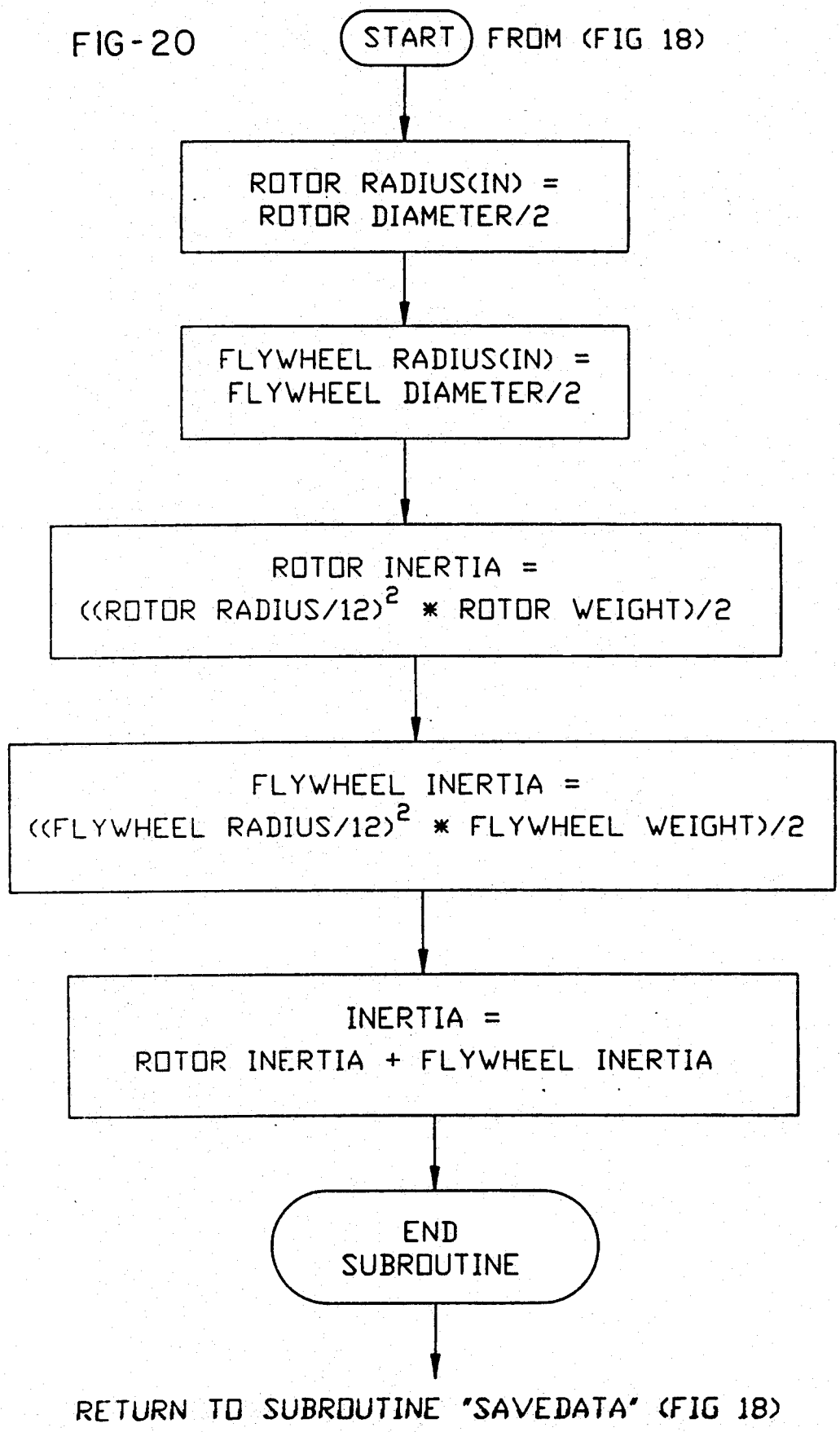
Figure 21:
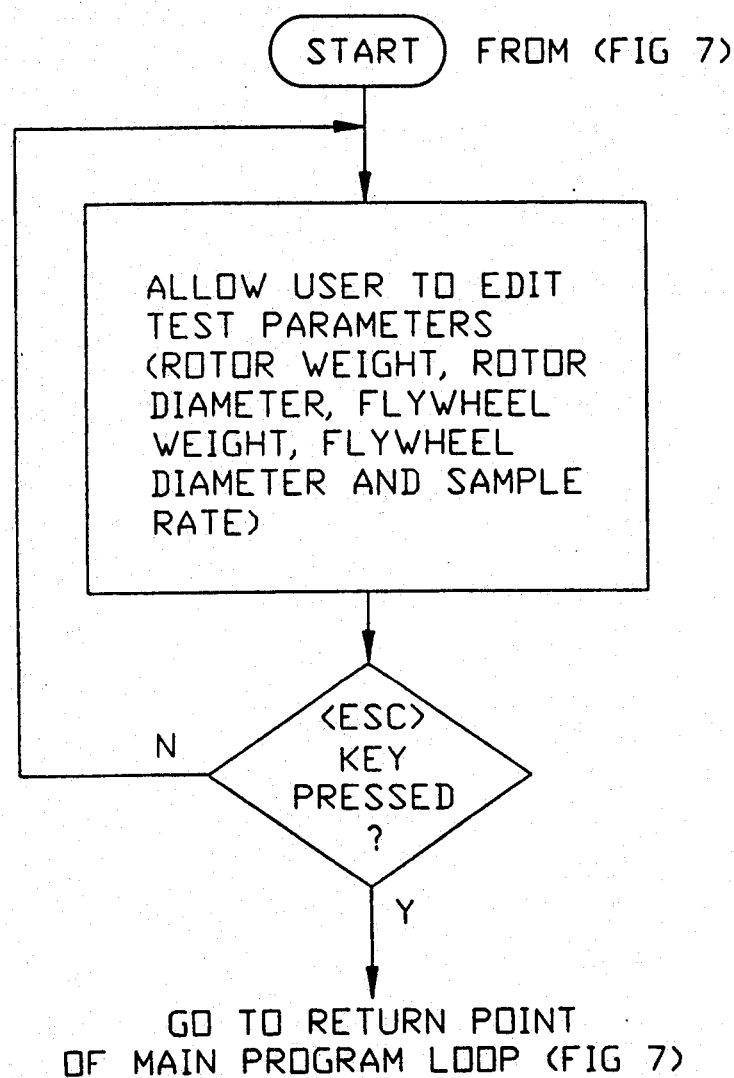

A subroutine labeled SAVEDATA is shown in FIGS. 18 and 19, a subroutine called CALCINERTIA is shown in FIG. 20, and a subroutine called MODIFY is shown in FIG. 21.

When the computer program is initiated, the operator is given the option of choosing the SYSTEM, the MODIFY, or the START routine. The SYSTEM option merely exits the program and returns the computer to its operating system or DOS. The MODIFY option is shown in FIG. 21 and allows the operator to edit any data previously entered, such as the motor rotor's weight and diameter, the weight and diameter of the flywheel, and to select the data sample rate.

If the operator chooses the START option, then the STARTTEST subroutine is selected. This routine permits the operator to chose between the first or the second embodiment, or between the voltage or current sync methods of measurement.

Figure 10:
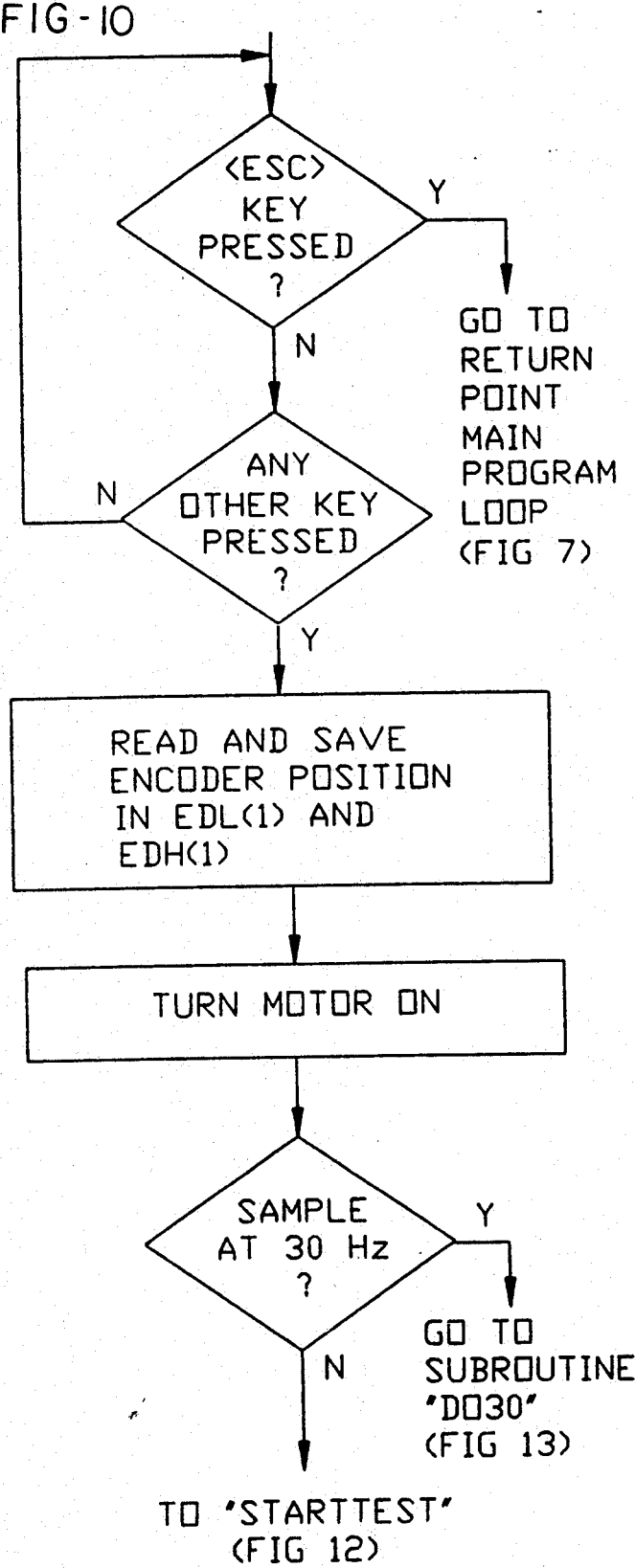
Figure 12:
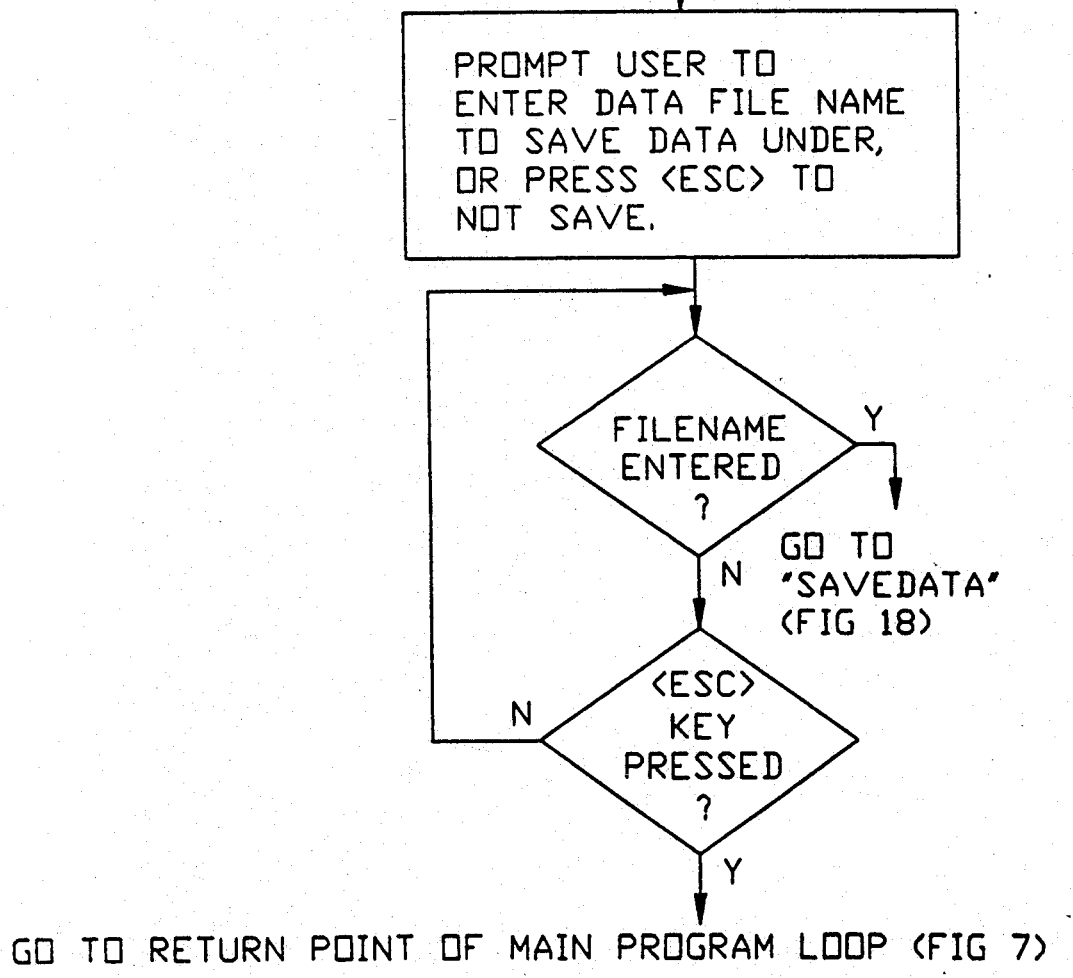

If the first or voltage sync method is selected, then the program moves to FIGS. 10 and 12. In this mode, the operator may selected between three data rates, represented by the subroutines DO30, DO60 and DO120. As previously explained, the data rate may be selected according to the resolution of the output desired. Encoder data is stored in the computer in a pair of locations designated EDL and EDH.

The SAVEDATA routine in FIGS. 18 and 19 is used to calculate and record the encoder data.

FIG. 4 shows the resolution obtained at a 60 Hz rate (DO60) while FIG. 5 shows the resolution obtained at a 120 Hz rate (DO120).

Figure 9:
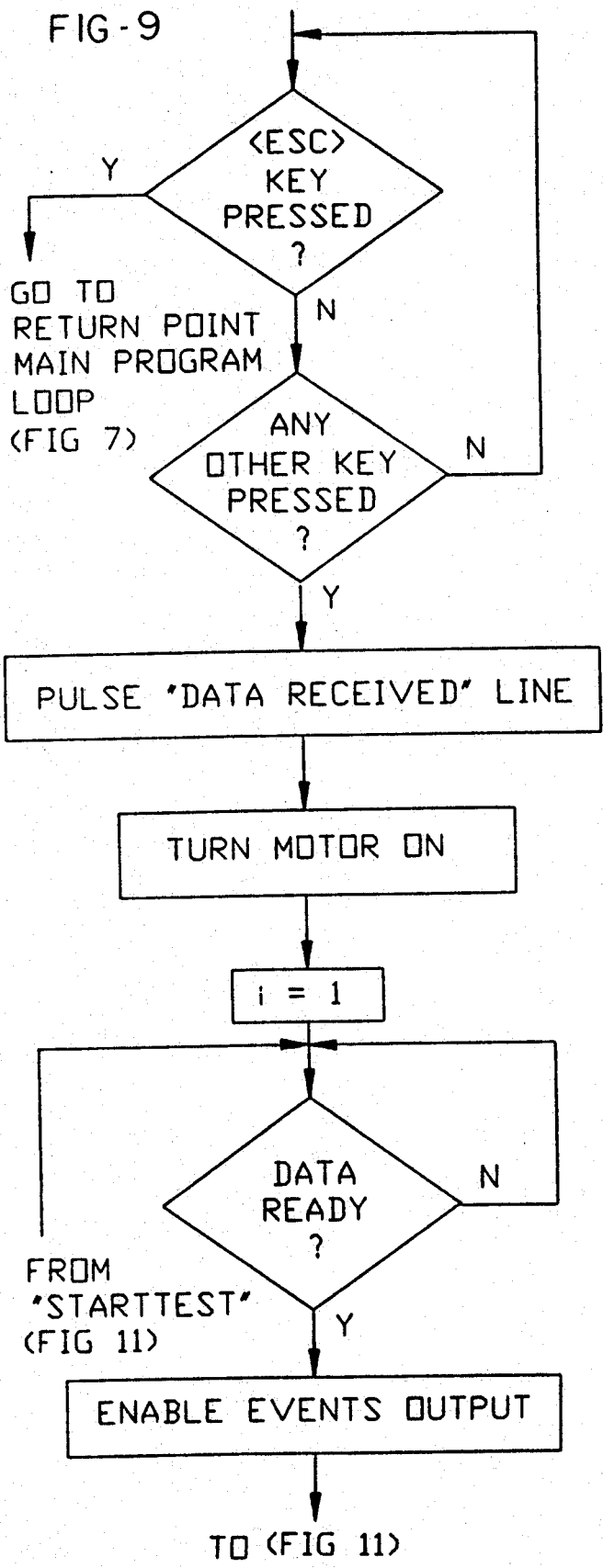

On the other hand, selecting the second embodiment, or the current sync mode, the program follows the path through FIGS. 9 and 11. This will produce a resolution similar to the 120 Hz mode shown in FIG. 5 except that both the encoder data and time data obtained from the oscillator 250 is recorded in the computer memory, with the encoder data stored in the memories designated EDL(i) and EDH(i) and the time data stored in the memories designated TDL(i) and TDH(i).

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. Method of testing the torque characteristics on a motor including the steps of
    attaching the shaft of said motor to a known inertial load,
    supplying power to the motor at a specified time,
    measuring the amount of rotation of the motor shaft at multiple, known time intervals from approximately the application of power to the motor until the motor reaches a desired speed,
    calculating the motor's torque by reference to the inertial load and the amount of motor shaft rotation within each of the time intervals, and
    displaying the motor's torque with reference to the speed of the motor shaft.

2. An electric motor testing apparatus for determining the torque available at the motor's output shaft, said apparatus comprising
    means for connecting a known inertial load to said motor's output shaft,
    means for supplying power to a motor under test to cause rotation of the motor's output shaft,
    means connected to the output shaft for sensing the amount of angular rotation thereof at multiple, known time intervals from approximately the application of power to the motor until the motor reaches a desired speed,
    means for computing the torque generated by said motor at each known time interval in response to changes in the angular rotation of the motor's output shaft.

3. A testing apparatus for alternating current electric motors which determines the torque available at the motor's output shaft from start up to full speed, said apparatus comprising
    means for connecting a known inertial load to said motor's output shaft,
    means for supplying power to a motor under test to cause rotation of the motor's output shaft,
    timer means for providing output signals at fixed intervals in timed relation to the alternating current power supplied to the motor,
    encoder means connected to the output shaft for indicating the rotation of the shaft,
    means responsive to said timer means for storing the output of said encoder means during each said fixed intervals of time from the start of the motor until it reaches full speed, and means for computing the torque generated by said motor at each known time interval in response to the changes in the angular rotation of the motor's output shaft.

4. A testing apparatus for alternating current electric motors which determines the torque available at the motor's output shaft from start up to full speed, said apparatus comprising means for supplying alternating current power to the motor, releasable means for connecting a known inertial load to said motor's output shaft, means for supplying a start signal to initiate a testing sequence, control circuit means responsive to said start signal for supplying alternating current power to a motor under test following the zero crossing of the alternating current power source thereby to initiate rotation of the motor's output shaft at a precise time, timer means responsive to said control circuit means for providing output signals at fixed time intervals in timed relation to the alternating current power supplied to the motor, an incremental encoder connected to the motor output shaft for providing output pulses proportional to the amount of rotation of the motor shaft, a counter connected to receive said output pulses from said incremental encoder, a data latch controlled by said timer means for capturing the value of the count in said counter means at the end of each timing interval in response to the output of said timer means, storage means responsive to said timer means for storing the value of the count captured by said data latch at each of said fixed intervals of time from the start of the motor at least until it reaches full speed, and means for computing the torque generated by the motor under test at each time interval in response to the amount of change in the angular rotation of the motor's output shaft from one time interval to the next.

* * * * *